(12) United States Patent
Wobben

(10) Patent No.: US 6,945,751 B1
(45) Date of Patent: Sep. 20, 2005

(54) ROTOR BLADE

(76) Inventor: Aloys Wobben, Argestrasse 19, Aurich, D-26607 (DE)

( * ) Notice: Subject to any disclaimer, the term of this patent is extended or adjusted under 35 U.S.C. 154(b) by 0 days.

(21) Appl. No.: 10/110,864

(22) PCT Filed: Jul. 8, 2000

(86) PCT No.: PCT/EP00/06494

§ 371 (c)(1),
(2), (4) Date: Aug. 21, 2002

(87) PCT Pub. No.: WO01/29414

PCT Pub. Date: Apr. 26, 2001

(30) Foreign Application Priority Data

Oct. 20, 1999 (DE) .............................. 199 50 620

(51) Int. Cl.$^7$ .............................................. F03D 1/06
(52) U.S. Cl. ...................................................... 416/61
(58) Field of Search .............................. 416/61, 146 R, 416/223 R; D23/411, 370

(56) References Cited

U.S. PATENT DOCUMENTS

| | | | |
|---|---|---|---|
| 5,784,978 A | 7/1998 | Saiz | 114/103 |
| 6,103,201 A * | 8/2000 | Green | D23/366 |
| 6,623,243 B1 * | 9/2003 | Hodos | 416/146 R |

FOREIGN PATENT DOCUMENTS

| | | |
|---|---|---|
| DE | 27 17 379 | 10/1978 |
| DE | 27 21 450 | 11/1978 |
| DE | 30 18 678 A1 | 11/1981 |
| DE | 44 42 628 A1 | 6/1996 |
| FR | 2 745 040 A1 | 8/1997 |
| GB | 2 308 867 A | 7/1997 |
| JP | 56113096 A * | 9/1981 ........... F04D 29/38 |
| JP | 61-193783 | 8/1986 |
| JP | 5-202890 | 8/1993 |
| JP | 61-28377 | 5/1994 |
| JP | 62-10779 | 8/1994 |

OTHER PUBLICATIONS

"Airliners of the World" by David Mondey (Aerospace Publishing 1983). pp. 27, 96, 117, 121, and 148.*

* cited by examiner

Primary Examiner—Edward K. Look
Assistant Examiner—Igor Kershteyn
(74) Attorney, Agent, or Firm—Seed IP Law Group PLLC

(57) ABSTRACT

Rotor blades for wind power installations of varying design configurations are known. Irrespective of the geometrical configuration of the rotor blades, all rotor blades are generally of a uniform color; typically. The rotor blades of the present invention better integrate a wind power installation into the landscape view, to improve environmental compatibility and to reduce the impact of the foreign body. That is to be achieved in particular in respect of installations with large rotor diameters (more than 40 m). A rotor blade comprising a rotor blade connection and a rotor blade tip and a surface which is arranged therebetween and which is divided into at least two regions which differ in respect of lightness and of which the lighter region is arranged closer to the rotor blade connection than the darker region which is of a natural shade and/or daylight sky shade and/or background shade.

8 Claims, 2 Drawing Sheets

$\phi_1 > \phi_2$

ROTOR BLADE

BACKGROUND OF THE INVENTION

1. Field of the Invention

The invention concerns a rotor blade of a wind power installation and a wind power installation having such a rotor blade.

2. Description of the Related Art

Rotor blades of the most widely varying design configurations have already long been known. Known rotor blades can be made from various materials such as for example aluminum, titanium, steel, composite fiber material (glass, carbon or aramide fibers), wood and the like. Irrespective of the geometrical configuration of the rotor blade material however all rotor blades are generally of a uniform color. In that respect a white coat of paint is preferred.

It is also known for a rotor blade to be provided with a signal-red coat of paint in the rotor blade tip region, which is required in particular when a wind power installation is located in the region of an airdrome or airport or a flight zone so that the wind power installation or the rotor blades can be better seen by flight traffic.

Wind power installations, like all building constructions, represent to a certain degree foreign bodies on the natural landscape. Admittedly, society accepts and welcomes the fact that wind power installations are used, because power can be very effectively produced therewith by a regenerative procedure, but nonetheless residents who live in the proximity of a wind power installation also repeatedly feel they are adversely affected by wind power installations.

BRIEF SUMMARY OF THE INVENTION

The object of the invention is to better integrate a wind power installation into the landscape view, to improve environmental compatibility and to reduce the impact of the foreign body. That is to be achieved in particular in respect of installations with large rotor diameters (more than 40 m).

The invention is based on the realization that, when the region of the rotor blade, which is associated with the rotor blade tip and which is of a relatively narrow width (compared to the regions in the proximity of the hub) and which upon rotation of the rotor assumes the greatest peripheral speed, is provided with a daylight sky-colored shade, the rotor appears smaller than in reality. Such a daylight sky-colored or natural-colored shade can be for example a bluish shade, a gray shade, a blue/gray shade, a greenish shade, a gray/greenish shade, a blue/greenish shade and/or a greenish, bluish, gray shade.

A rotor with one or more rotor blades of the above-described kind optically arouses the impression on the part of an observer that the overall rotor is markedly smaller than it is in reality. That "optical reduction in size" occurs in particular when the sky is cloudy (or in diffuse light). The invention makes it possible to achieve an "optical reduction" in the overall rotor blade diameter of more than 10–20%. Instead of the above-mentioned color shades, the color shade in the darker region can also be so selected that it is always matched to the background in front of which the wind power installation stands.

The invention is described in greater detail hereinafter by means of a specific embodiment.

BRIEF DESCRIPTION OF THE SEVERAL VIEWS OF THE DRAWING(S)

DETAILED DESCRIPTION OF THE INVENTION

Figure 1:
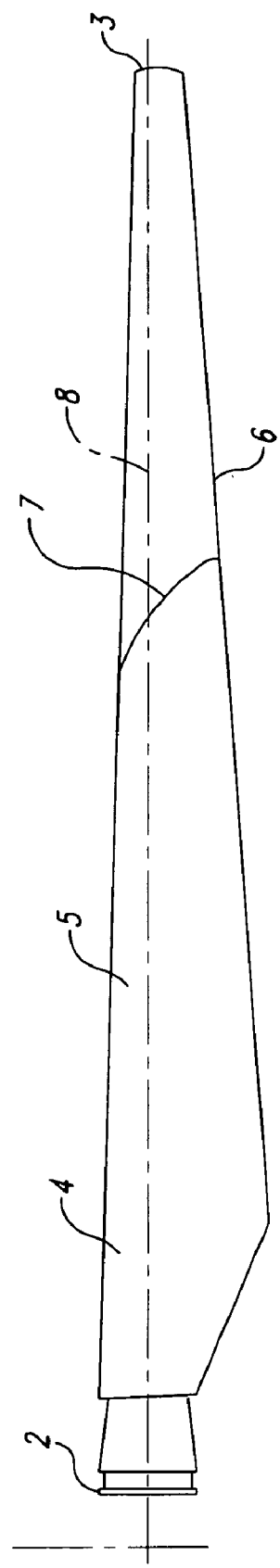
FIG. 1 shows a view of rotor blade.

FIG. 1 is a view of a rotor blade 1 with a rotor blade connection 2 at one end and a rotor blade tip 3 at the other end. The surface of the rotor blade on which the wind impinges (dynamic pressure surface) is divided into two regions 4, 5 which are of different colors, of which the region 5 which is associated with the rotor blade connection 2 is markedly lighter than the region 4 which is associated with the rotor blade tip 3. The darker one of the two regions is contained in particular in a gray, blue or gray/blue or in another daylight sky-colored or natural-colored or background-colored shade. In contrast to a known signal-red coating of paint on the tip region of the rotor blade, in the case of the rotor blade 1 according to the invention that region is precisely not optically clearly visible but in contrast is provided with a "quasi" camouflage color so that an individual rotor blade which rotates in a wind power installation with the rotor thereof is optically scarcely any longer perceptible, at least in the outer rotor blade tip region 4 which is blue, gray or blue/gray, in particular when the sky is cloudy, which is very frequently the case precisely in areas which are close to the coast and in which most wind power installations are set up. In this respect, the light region of the rotor blade occupies about 50–70% of the overall area while the darker region occupies about 10–30% of the total surface area of the rotor blade.

It will be appreciated that it is also possible for only the front side of the rotor blade to be provided with the corresponding coloration. It will be noted however that the rear side of the rotor blade may also be provided with the color configuration according to the invention.

In this case the transition between the light and darker regions can be an abrupt one or it can also be a fluid one and the boundary line between the dark and the light regions does not need to involve a uniform spacing in relation to the rotor blade connection but can also be formed by an arc 7 (as shown) so that at the trailing edge 6 of the rotor blade the light region 5 projects into the dark region 4.

It will be appreciated that it is also possible for the rotor blade tip to be kept of the same color as the darker region of the rotor blade surface so that, in the case of a wind power installation whose rotor is rotating, the person viewing same can now scarcely any longer perceive the true length of the rotor blade or the true diameter of the rotor because the darker nature of the rotor blade tip region causes an "optical reduction in size" of the rotor and the person viewing same believes that the overall rotor is markedly smaller than corresponds to reality. This means that such a wind power installation is perceived as being less of a nuisance.

This means that it is also possible for the rotor blade diameter overall to be still further increased, which causes an increase in the operating efficiency of the wind power installation without such an increase in the size of the rotor blade diameter also entailing an increase in the "perception of a foreign body" in respect of the wind power installation overall.

Figure 2:
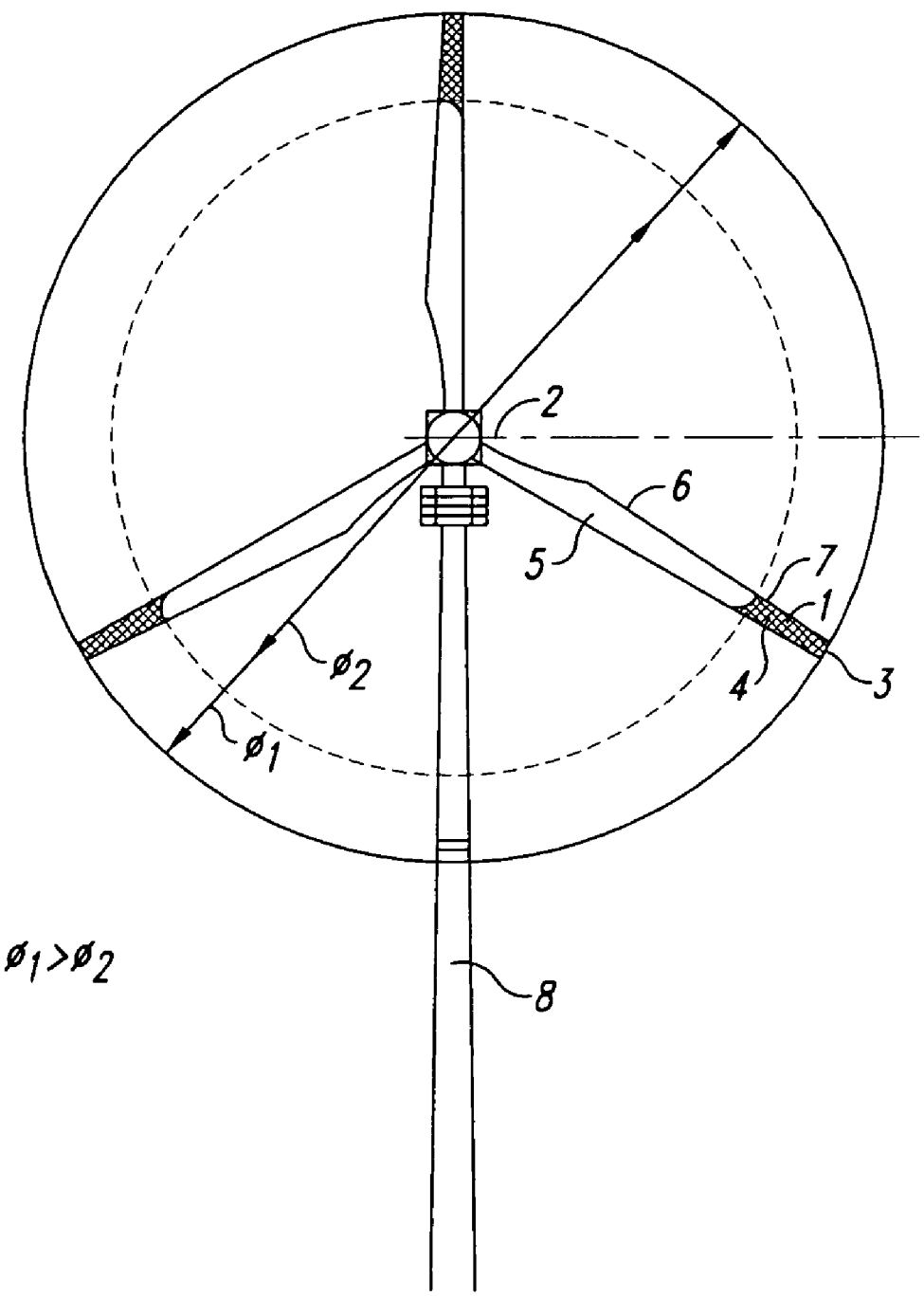
FIG. 2 shows a view of a wind power installation with a rotor which has three rotor blades.

FIG. 2 shows a view of a wind power installation with three rotor blades as described above. The wind power installation comprises a tower 8 and a machine assembly which is mounted thereon and which carries a rotor 7 to which the three rotor blades 1 are fixed.

As the part of the rotor blades which is remote from the rotor blade hub connection is colored in a natural color or daylight sky-colored or suitable background colors, that region can scarcely be perceived by a person viewing same when the wind power installation is operational because each individual rotor blade is relatively narrow in the rotor blade tip region, compared to the regions of the rotor blade which are towards the rotor blade hub, and at the same time the peripheral speed (not the angular speed) in the rotor blade tip region is markedly higher than in the regions of the rotor blade, which are associated with the hub.

By virtue of the "natural coloration" of the surface of the rotor blade in the rotor blade tip region, it is not possible for the viewer to still detect the precise contour of the rotor blade tip region and the rotor of the wind power installation appears generally markedly smaller to the person viewing same.

Instead of the two different color shade regions described, it is also possible to provide a plurality of color shade regions, in which case the darkest of those color shade regions should always be arranged at the rotor blade tip region.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A rotor blade for use in a wind power installation comprising a wind power rotor blade connection region and a rotor blade tip region and a surface which is arranged therebetween and which is divided into at least two regions which differ in respect of lightness and of which the lighter region is arranged closer to the rotor blade connection region than the darker region and the darker region has more blue, gray, green and/or blue/gray, green shades than the lighter region.

2. A rotor blade as set forth in claim 1 wherein said lighter region is white.

3. A rotor blade as set forth in claim 1 characterized in that the lighter region occupies about 40–90% of the rotor blade surface area.

4. A rotor blade as set forth in claim 1 characterized in that the darker region occupies about 10–50% of the rotor blade surface area.

5. A rotor blade as set forth in claim 1 characterized in that there are provided a plurality of dark regions of which the darkest is in the region of the rotor blade tip.

6. A rotor blade as set forth in claim 1 characterized in that the transition between the light and dark regions is a flowing one.

7. A wind power installation comprising:
   at least one rotor blade, the rotor blade having:
      a rotor blade connection;
      a rotor blade tip;
      a surface which is arranged therebetween and which is divided into at least two regions which differ in respect of lightness and of which the lighter region is arranged closer to the rotor blade connection than the darker region which is of a natural shade and/or daylight sky shade and/or background shade, wherein the darker region has more bluish shade, a gray shade, a blue/gray shade, a greenish shade, a gray/greenish shade, a blue/greenish shade and/or a greenish, bluish, gray shade than the lighter region.

8. A rotor blade for use in a wind power installation comprising a wind power rotor blade connection region and a rotor blade tip region and a surface which is arranged therebetween and which is divided into at least two regions which differ in respect of lightness and of which the lighter region is arranged closer to the rotor blade connection region than the darker region and the darker region has more blue, gray, green shades or combinations thereof than the lighter region.

* * * * *